United States Patent
Morrow et al.

(10) Patent No.: US 9,767,225 B2
(45) Date of Patent: Sep. 19, 2017

(54) SYSTEMS AND METHODS FOR PREDICTING THE PERFORMANCE OF A ROTARY UNIT OPERATION ON A WEB

(71) Applicant: The Procter & Gamble Company, Cincinnati, OH (US)

(72) Inventors: Clint Adam Morrow, Union, KY (US); Aiqin Li, Cincinnati, OH (US); Noble Lester Rye, II, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 800 days.

(21) Appl. No.: 14/276,477

(22) Filed: May 13, 2014

(65) Prior Publication Data

US 2015/0331973 A1     Nov. 19, 2015

(51) Int. Cl.
    *G06G 7/48*     (2006.01)
    *G06F 17/50*    (2006.01)

(52) U.S. Cl.
    CPC .......... *G06F 17/50* (2013.01); *G06F 17/5009* (2013.01)

(58) Field of Classification Search
    CPC .............................. G06F 17/50; G06F 17/5009
    USPC ............................................................ 703/7
    See application file for complete search history.

(56) References Cited

U.S. PATENT DOCUMENTS

| | | | | |
|---|---|---|---|---|
| 6,251,207 B1* | 6/2001 | Schultz | ..................... | B31F 1/07 156/209 |
| 7,048,885 B2* | 5/2006 | Weiher | .............. | A61F 13/15731 264/284 |
| 2007/0283823 A1* | 12/2007 | Zeigler | ............... | B30B 15/0094 100/47 |
| 2011/0295563 A1* | 12/2011 | McDaniel | ........... | G06F 17/5009 703/1 |

(Continued)

FOREIGN PATENT DOCUMENTS

CN          201438139          4/2010

OTHER PUBLICATIONS

Bracciali, A., Cascini, G., Rolling Contact Force Energy Reconstruction, Journal of Sound and Vibration vol. 236, Issue 2, Sep. 14, 2000, pp. 185-192.

(Continued)

*Primary Examiner* — Eunhee Kim
(74) *Attorney, Agent, or Firm* — Andres E. Velarde

(57) ABSTRACT

A system for predicting the performance of a rotary unit operation on a web. The system includes a first rotary roll, a second rotary roll, a nip gap between the first rotary unit and the second rotary roll, a web enabled to travel through the nip, a predetermined pattern, and a computing device comprising a processor and a memory component. The first rotary roll and the second rotary roll are enabled to imprint the predetermined pattern on the web. The memory component stores logic that, when executed by the processor, causes the system to perform at least the following: receive (Continued)

input characteristics of the first rotary roll and the second rotary roll, the web, and the initial nip-gap; receive the predetermined pattern; simulate a transformation performance on the web by the first rotary roll and the second rotary roll; output an analysis demonstrating a load impact factor; and analyze one or more load impact factors to determine if the system will output the predetermined pattern and if the transformation is robust.

20 Claims, 5 Drawing Sheets

(56) References Cited

U.S. PATENT DOCUMENTS

| | | | |
|---|---|---|---|
| 2012/0316853 A1* | 12/2012 | Looney | G06F 17/5086 703/7 |
| 2014/0133877 A1* | 5/2014 | Samei | G03G 15/2042 399/69 |
| 2015/0331376 A1* | 11/2015 | Shimmura | G03G 15/2042 399/69 |

OTHER PUBLICATIONS

Gagnon, L., Richard, M.J., Lévesque, B., Simulation of a Rotating Device That Reduces the Aerodynamic Drag of an Automobile, Transactions of the Canadian Society for Mechanical Engineering, vol. 35, Issue 2, 2011, pp. 229-249.

Deganello, D., Croft, T.N., Williams, A.J., Lubansky, A.S., Gethin, D.T., Claypole, T.C., Numerical Simulation of Dynamic Contact Angle Using a Force Based Formulation, Journal of Non-Newtonian Fluid Mechanics, vol. 166, Issue 16, Sep. 1, 2011, pp. 900-907.

Said, W., Nemer, M., Clodic, D., Modeling of Dry Pressure Drop for Fully Developed Gas Flow in Structured Packing Using CFD Simulations, Chemical Engineering Science, vol. 66, Issue 10, May 15, 2011, pp. 2107-2117.

Yang, A., Numerical Stimulation and Optimization of Process Chain in High Pressure Sheet Metal Forming (Conference Paper), Proceedings—3rd International Conference on Measuring Technology and Mechatronics Automation, ICMTMA 2011, vol. 2, 2011.

Qin, Q., Wu, D., Li, J., Zang, Y., Rolling Force Research on Cogging Rolling of H-Beam (Conference Paper), Key Engineering Materials vol. 450, 2011, pp. 87-90 3rd International Conference on Advanced Design and Manufacture, ADM2010; Nottingham; United Kingdom; Sep. 8, 2010 through Sep. 10, 2010; Code 83157.

Melot, V., Auvity, B., Peerhossaini, H., Investigation of Flow and Forces on a Strongly Accelerated Circular Cylinder (Conference Paper), American Society of Mechanical Engineers, Pressure Vessels and Piping Division (Publication) PVP vol. 4, 2005, Article No. PVP2005-71185, pp. 45-54, 2005 ASME Pressure Vessels and Piping Conference, PVP2005; Denver, CO; United States; Jul. 17, 2005 through Jul. 21, 2005; Code 66224.

Ramö, J., Vuoristo, T., Kuokkala, V.-T., Simbierowicz, G., Vanninen, R., Influence of Rubber Parameters on the Calculation of Nip Pressure Profile in Paper Coating (Conference Paper), Constitutive Models for Rubber IV—Proceedings of the 4th European Conference for Constitutive Models for Rubber, ECCMR 2005, pp. 415-420 4th European Conference for Constitutive Models for Rubber, ECCMR 2005; Stockholm; Sweden; Jun. 27, 2005.

Xiong, Y.-G., Tan, J.-P., Li, X.-D., Calculation of Rolling-Force Distribution of Thin Gauge Roll-Casting, Zhongguo Youse Jinshu Xuebao/Chinese Journal of Nonferrous Metals vol. 15, Issue 8, Aug. 2005, pp. 1243-1247.

Liu, X., Zhang, X., Numerical Simulation of the Roll Pressure Distribution of Aluminum Strip on Hot Rolling Process (Conference Paper), Progress of Machining Technology—Proceedings of the Seventh International Conference on Progress of Machining Technology, ICPMT'2004, pp. 747-752.

Morimoto, T., Kurahashi, R., Chikushi, I., Yanagimoto, J., Mathematical Modeling for the Simultaneous Prediction of Rolling Force and Microstructure Evolution in the Tandem Hot Rolling of Fine Grain Steel Sheets and Plates, Tetsu-To-Hagane/Journal of the Iron and Steel Institute of Japan vol. 88, Issue 11, Nov. 2002, pp. 747-754.

Bandyopadhyay, A., Ramarao, B.V., Shih, E.C., Transient Response of a Paper Sheet Subjected to a Travelling Thermal Pulse: Evolution of Temperature, Moisture and Pressure Fields, Journal of Imaging Science and Technology vol. 45, Issue 6, Nov. 2001, pp. 598-608.

Manesh, H.D., Taheri, A.K., An Investigation of Deformation Behavior and Bonding Strength of Bimetal Strip During Rolling, Mechanics of Materials vol. 37, Issue 5, May 2005, pp. 531-542.

Feng, X., Numerical Analysis of Distribution of Friction Force During H-Beam Rolling, Run Hua Yu Mi Feng/ Lubrication Engineering Issue 6, Jun. 2006, pp. 78-80.

\* cited by examiner

SYSTEMS AND METHODS FOR PREDICTING THE PERFORMANCE OF A ROTARY UNIT OPERATION ON A WEB

FIELD OF THE INVENTION

The present application relates generally to systems and methods for predicting the performance of a rotary unit operation on a moving web.

BACKGROUND OF THE INVENTION

Web-based products often includes a moving web of material, such as paper, non-woven, fibrous materials, polymeric films, plastic, or similar materials in a machine direction that moves through a rotary unit. Often, the moving web of material has one or more processes done such as, for example, printing, embossing, cutting, bonding, or a combination of processes such as gluing and embossing.

During these processes, it is important to understand the interaction between the rolls and the web of material. For example, one process includes imprinting a predetermined pattern onto the web as it travels through one or more rotary units. Each rotary unit may have at least two rotary rolls with a nip gap between them. The imprint made by the rotary unit may be affected by several inputs such as, for example, the characteristics of the web including the thickness of the web and the material making the web. Other inputs include the initial nip gap between the rotary rolls and the hardness of the rotary rolls which may be driven by the material that makes up the rotary rolls. Other inputs may include the applied load to the rotary rolls, the web speed, the rotary rolls angular speed, the web material stress-strain curve, bearer ring dimension, and spacer block dimension.

These inputs must be changed to render the proper imprint pattern. As such, there remains a need to model the effects of rotary inputs and web inputs to determine if the inputs will render a good imprint and a robust process. The model may be correlated to a rotary unit such that one may change certain inputs to the system and the simulation may determine if the appropriate imprint is achievable.

SUMMARY OF THE INVENTION

A system for predicting the performance of a rotary unit operation on a web is disclosed. The system includes a first rotary roll, a second rotary roll, an initial nip gap between the first rotary roll and the second rotary roll, a web enabled to travel through the nip, a predetermined pattern, and a computing device comprising a processor and a memory component. The first rotary roll and the second rotary roll are enabled to imprint the predetermined pattern on the web. The memory component stores logic that, when executed by the processor, causes the system to perform at least the following: receive input characteristics of the first rotary roll and the second rotary roll, the web, and the initial nip gap; receive the predetermined pattern; simulate a transformation performance on the web by the first rotary roll and the second rotary roll; output an analysis demonstrating a load impact factor; and analyze one or more load impact factors to determine if the system will output the predetermined pattern.

A method for predicting the performance for a rotary unit operation is also disclosed. The method includes simulating, by a computing device, a nip gap between two rotary rolls wherein at least one of the two rotary rolls is an imprint wheel; The method further includes determining, by the computing device, a web of material travel speed, wherein the web of material travels in the nip between the two rotary rolls and determining, by the computing device, the impact of at least one of the two rotary rolls on the web of material. The method includes outputting an analysis demonstrating a load impact factor, iterating using a load impact factor to determine a desirable impact of at least one of the two rotary rolls on the web of material to achieve a predetermined pattern, and outputting the desired inputs to achieve the desired impact level on the web of material.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION OF THE INVENTION

Embodiments disclosed herein include systems and methods for predicting the performance of a rotary unit operation on a web. Specifically, embodiments disclosed herein may be utilized to determine the appropriate inputs for a rotary unit to imprint a predetermined pattern on a web of material.

Figure 1:
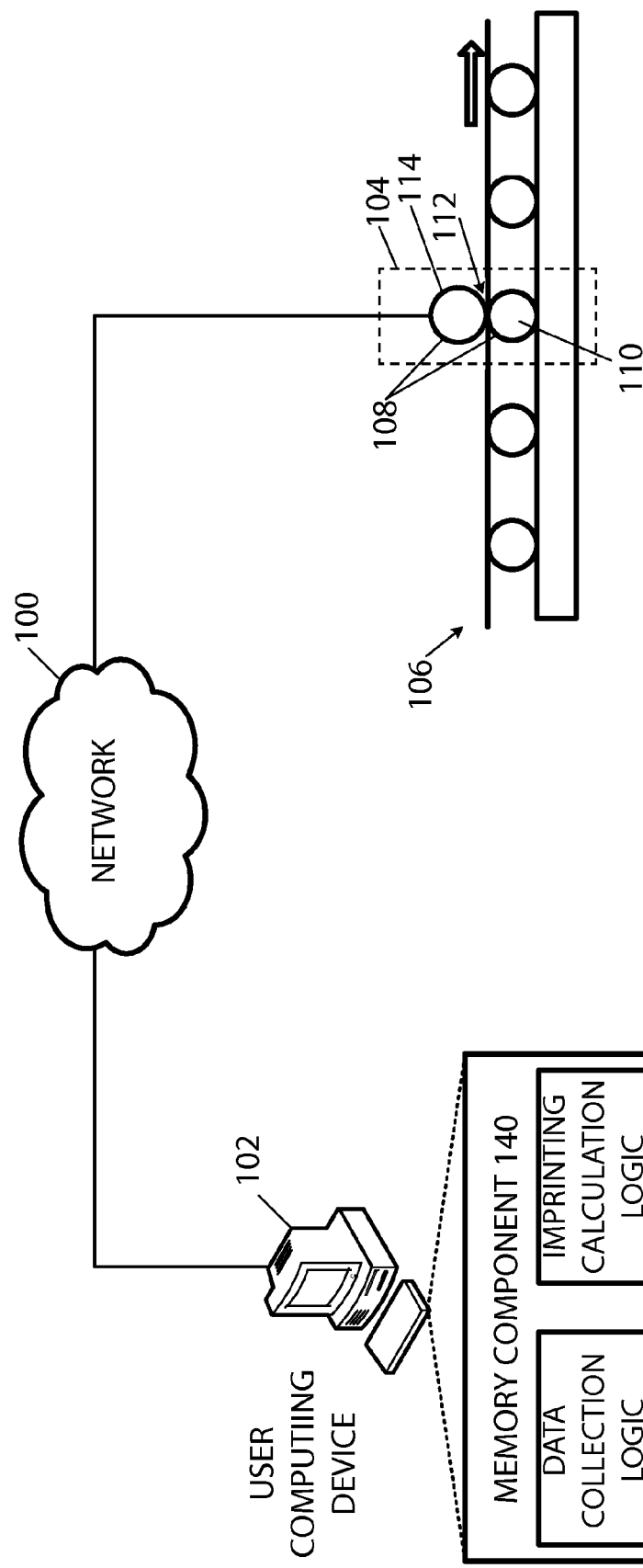
FIG. 1 depicts a web imprinting environment, according to embodiments disclosed herein.

Referring now to the drawings, FIG. 1 depicts a web imprinting environment, according to embodiments disclosed herein. As illustrated, a network 100 is coupled to a user computing device 102 and a rotary unit 104. The user computing device 102 may include a memory component 140 that stores data gathering logic 144a and imprinting calculation logic 144b. As described in more detail below, the data gathering logic 144a may cause the user computing device 102 (when executed by a processor) to determine the parameters described below. These parameters may be determined via a user input, a sensor input, and/or via other mechanisms. Additionally, the imprinting calculation logic 144b may cause the user computing device 102 to perform one or more calculations for determining the appropriate process setting including an initial nip gap level to imprint the predetermined image on the chosen web.

The rotary unit 104 may interact with a web of material 106 (also referred to as the "moving web of material"), which travels in the machine direction (depicted with an arrow). The rotary unit may comprise of one or more rotary rolls 108, such as, for example, imprint wheels, anvil wheels, bonding wheels, cutting wheels, or any other form of roll enabled to interact with the web or move the web in the machine direction. As shown in FIG. 1, the rotary unit 104 may comprise of one imprint wheel 114 configured to imprint a pattern and an anvil wheel 110. The rotary unit 104 may be enclosed or open. An initial nip gap 112 exists between the imprint wheel 114 and the anvil wheel 110. In an embodiment, the rotary unit may comprise of two wheels, each designed to imprint a pattern onto the web. In an embodiment, the system is enabled to model a plurality of rotary wheels that each imprint a pattern, same or different, to a web while sharing a common anvil wheel. The shared anvil wheel may be of a size wherein at each rotary unit, the anvil wheel appears flat.

The rotary unit may be configured for communicating with the user computing device 102, such as via a computing device on the rotary unit. The rotary unit may communicate one of many characteristics to the computing device, such as, for example, the nip gap, the pressure exerted on the rotary rolls, and force exerted onto the web by the rotary rolls.

Regardless of the mechanism, the user computing device 102 may receive information from the rotary unit 104 to determine web speed, accuracy of the imprint, and/or other information described below.

Figure 2:
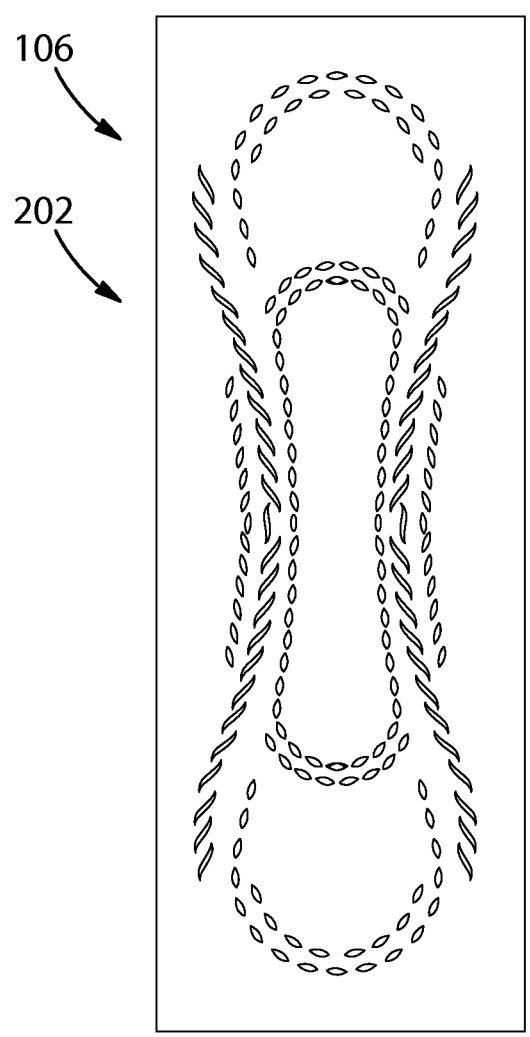
FIG. 2 depicts an overhead view of a web of material with a desired image, according to embodiments disclosed herein.

FIG. 2 depicts an overhead view of a web of material 106, and a desired image 202, according to embodiments disclosed herein. As illustrated, the rotary unit may be instructed to imprint a desired image 202 on the moving web of material 106.

Figure 3:
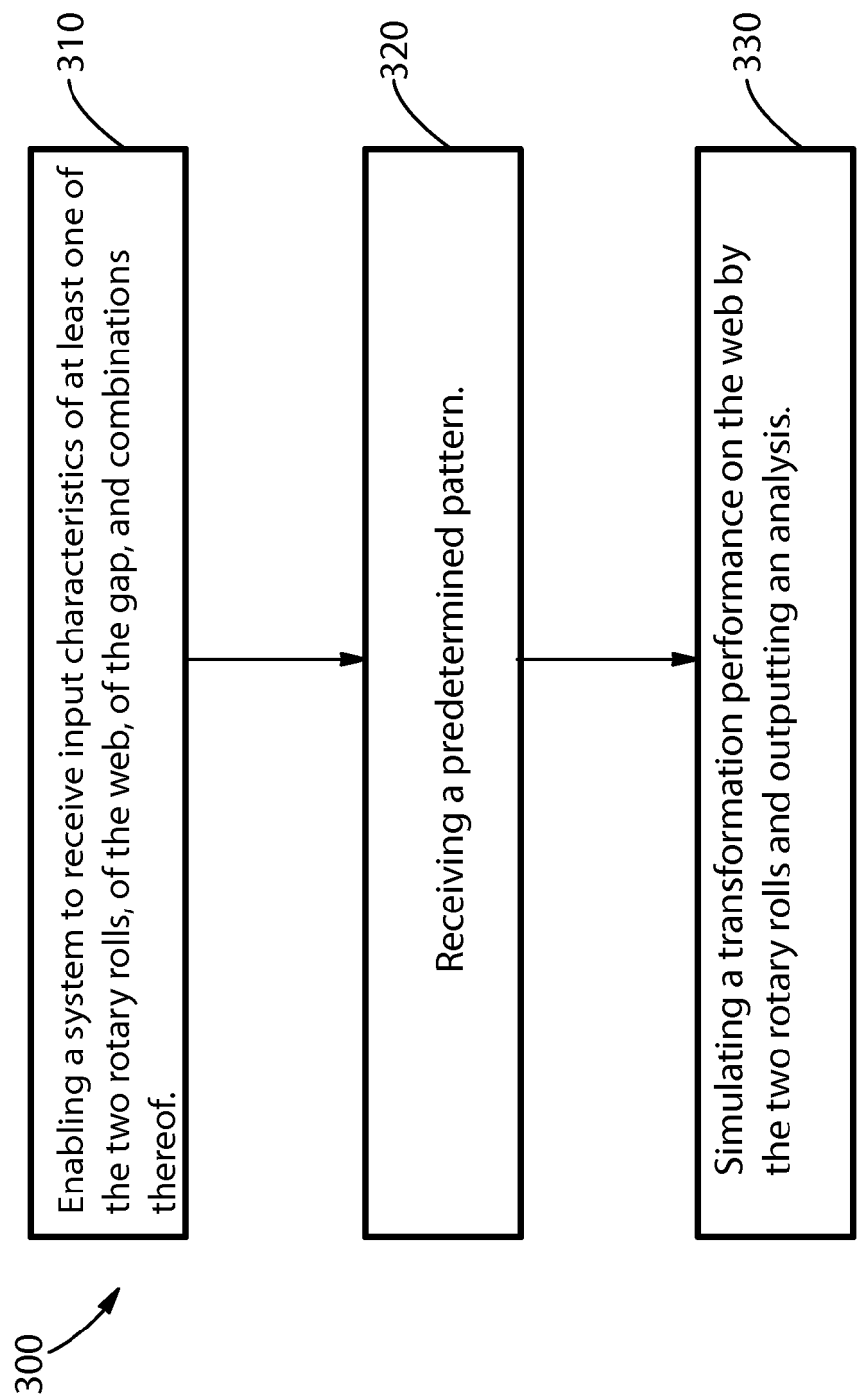
FIG. 3 depicts a flowchart for image imprinting on a web process, according to embodiments disclosed herein.

FIG. 3 depicts a flowchart 300 for predicting the performance of a rotary unit, according to embodiments disclosed herein. As illustrated in block 310, the method includes enabling a system to receive input characteristics of at least one of the first rotary roll, the second rotary roll, the web, the nip, and combinations thereof. The system may further receive a predetermined pattern 320. The method further includes simulating a transformation performance on the web by the first rotary roll and the second rotary roll and outputting an analysis 330.

The method includes enabling a system to receive input characteristics of at least one of the first rotary roll, the second rotary roll, the web, the nip, and combinations thereof 310. Inputs of the first rotary roll and the second rotary roll may include, for example, a stiffness measurement for one or more of the rolls, a diameter for one or more of the rolls, a pliability measurement for one or more of the rolls, the mass of one or more of the rolls, a damping measurement of one or more of the rolls, other physical dimensions of one or more of the rolls, and combinations thereof. Inputs related to the web may include, for example, the web material, the thickness of the web, the web stress-strain curve, the temperature of the web, a damping measurement of the web, and combinations thereof. Inputs of the nip may include, for example, a nip gap at a point of closest approach between rotary rolls.

The system may further receive a predetermined pattern 320. The predetermined pattern represents the desired imprinted pattern on the web. The predetermined pattern may be any suitable pattern that may be imprinted onto a web.

The method further includes simulating a transformation performance on the web by the first rotary roll and the second rotary roll and outputting an analysis 330. The simulation may include one or more steps, including, for example, determining an appropriate nip gap response for a chosen material, computing a force acting on the web of material, and determining the reaction force provided by the material on the rotary unit. The output analysis may include load impact factors such as, for example, a contact pressure; an appropriate pressure range for the chosen material to imprint the predetermined pattern; a pressure load on one or more rotary rolls, a load sharing between the rotary rolls, a load sharing between a bearing, nip and/or a bearer ring, identifying potential roll vibration issue, and combinations thereof.

Determining the force provided by the pattern and the force provided by the material may include adding the masses of the rolls and bearings plus the damping of the various components plus the stiffness of material, bearers or wedge blocks and bearings. In order to determine the gap response at the nip, the instantaneous load balance between the nip and a gap control mechanism. The gap control mechanism may include bearer rings, wedges, and spacer blockers. The gap control mechanism may set the initial gap for the system in an unloaded configuration. Once the system is loaded, the instantaneous load balance may be determined. This may be done by continually predicting the nip gap between the one or more rotary rolls. The nip gap response may be dynamic, depending upon the system load, size and stiffness of the gap control mechanism, a variation in pattern, and the stiffness of the material web. An algorithm continually monitors the gap at the nip. Once the nip gap is known, the algorithm may compute the resultant force acting on the rolls and material such as, for example, the stress on the material web, the strain on the material web, the contact area between the rolls and the material web, and the contact pressures. The system may use the computed values to compute a reacted nip force. The nip force may change thereby changing the gap and the instantaneous load balance between the gap control mechanism and the nip.

In an embodiment, the algorithm may use a scale factor such as, for example, a scale factor between 0.5 and 1.0. In the scale factor, 0.5 may represent no recovery of the material once force is no longer exerted on the pattern and anvil rolls and 1.0 may represent that the material has full recovery and the transformation has had no effect on the product. The scale factor may be multiplied by the sum of the forces to determine a total force acting on the material or on the roll.

When material enters into the nip the web of material begins to exert pressure on the pattern and anvil rolls that are compressing it. The magnitude of the force being exerted depends on the geometry of the rolls and the pattern that is in the nip as well as the material property of the web of material.

The output analysis may be used to determine if the predetermined pattern was imprinted on the web.

In an embodiment, the system may further determine the web speed of travel and simulate the forces at various speeds of travel for the web.

In an embodiment, the system may iterate using a load impact factor to determine a desirable impact of at least one of the two units on the web of material to achieve a predetermined pattern. The system may further output the desired inputs to achieve the desired impact level on the web of material.

In an embodiment, the system may have a plurality of pattern rolls that work with one large anvil roll to imprint a complex pattern wherein a first pattern role imprints a first pattern on the web and a second pattern role imprints a second pattern on the web. The system may simulate each pattern role individually or may simulate the entire system at once. This allows one to determine if the overall predetermined pattern will be properly imprinted while allowing for the isolation of issues within the overall system. The system may output desired inputs for each of the first pattern role versus the second pattern role so that the overall predetermined pattern may be achieved.

Figure 4:
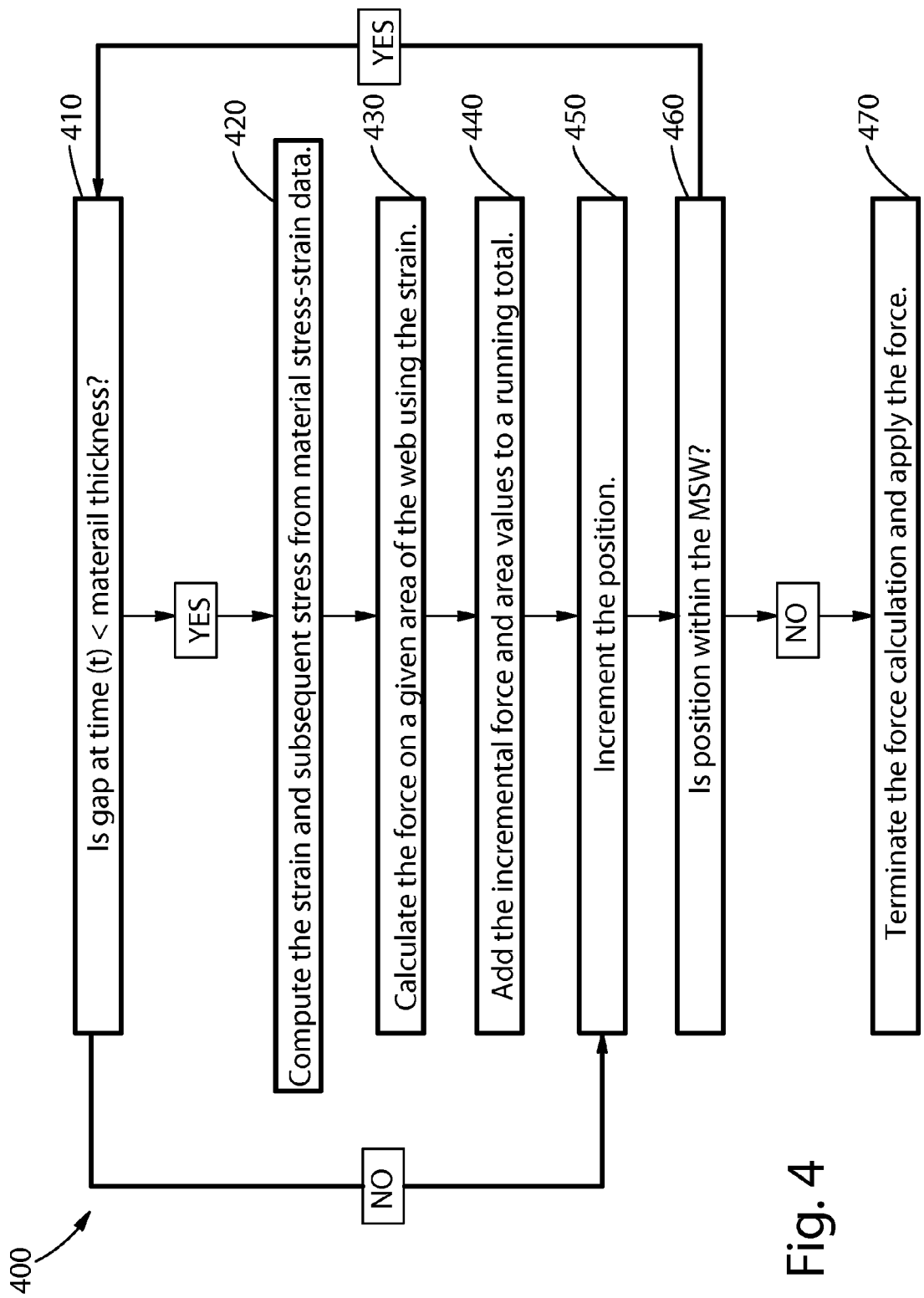
FIG. 4 depicts a flowchart for determining an appropriate nip response for a chosen web material, according to embodiments disclosed herein.

FIG. 4 shows a flowchart 400 for determining an appropriate nip gap response for a chosen web material. To determine the appropriate nip gap response for a chosen web of material, a total force is computed incrementally in a machine direction (MD) across a Maximum Search Width (MSW). MSW is defined by the nip-width along the machine direction length of the rotary unit rolls contacting the web. In an embodiment, the MSW can be defined by taking the maximum material thickness and intersecting that with the imprint wheel and anvil wheel geometry to find an average chord length. As shown in the figure, the nip gap at a time (t) is compared to the thickness of the material to determine if the gap at time (t) is less than the material thickness 410. If the thickness is less than the current gap, nothing is done and the position of the web is incremented by a certain step along the MD. If the thickness is greater than the current gap, the method computes the strain and subsequent stress from material stress-strain data. 420. The strain is then used to calculate the force on a given area of the web 430. This is done by using the area balance section data and the MD step size incremental area multiplied by the stress to determine the incremental force. The method then adds the incremental force and area values to a running total 440. After adding the incremental force and area to the running totals, the position is incremented 450. Once incremented, the position is then checked to see whether or not the position is within the MSW 460. If the position is within the MSW, then the analysis goes back to comparing the nip gap at a time (t) to the thickness of the material 106. If the position is not within the MSW, the force calculation is terminated and the force is applied 470.

Figure 5:
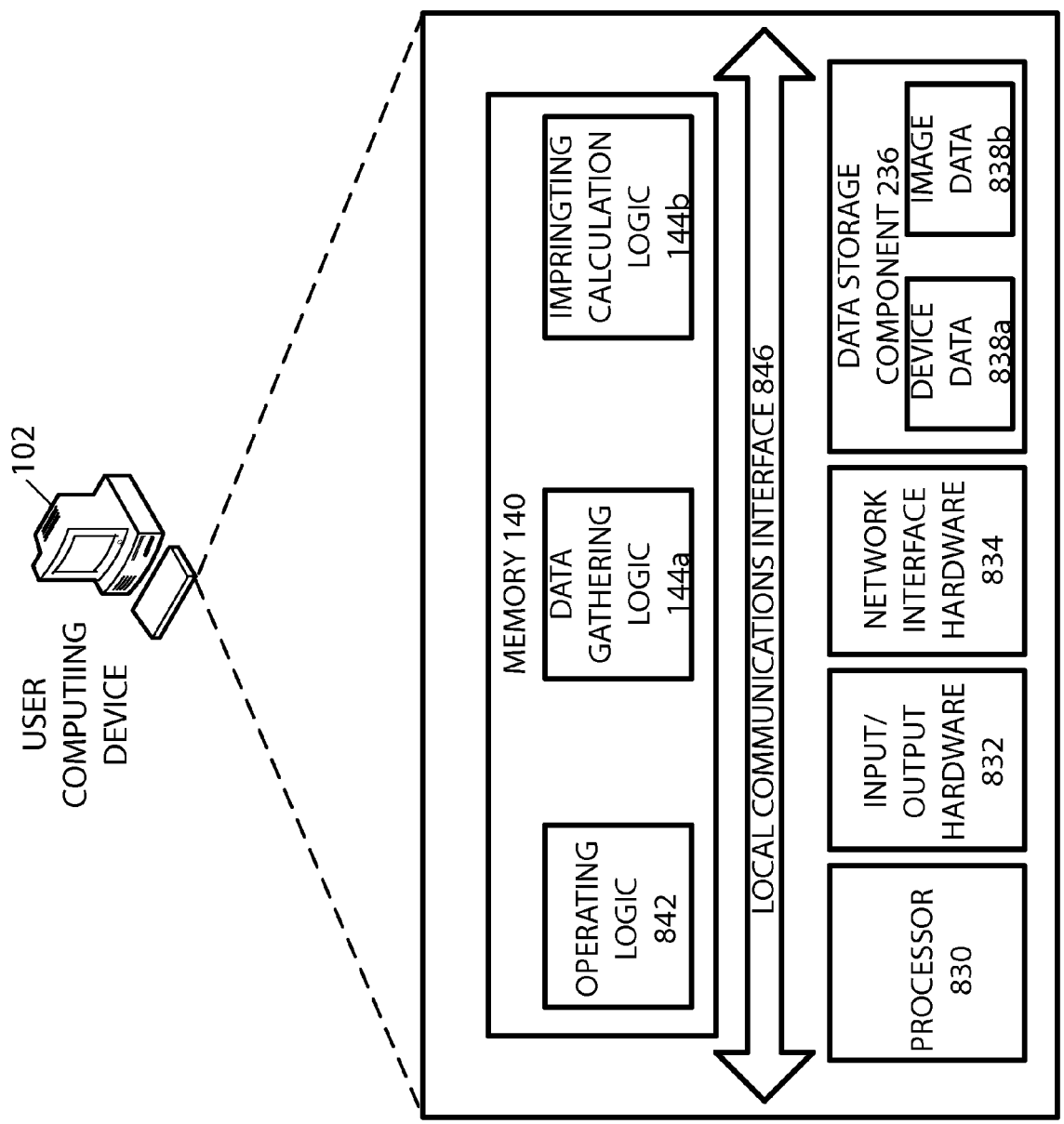
FIG. 5 depicts a user computing device that may be utilized for image imprinting on a web, according to embodiments disclosed herein.

FIG. 5 depicts a user computing device 102 that may be utilized for image imprinting on a web, according to embodiments disclosed herein. In the illustrated embodiment, the user computing device 102 includes a processor 830, input/output hardware 832, network interface hardware 834, a data storage component 236 (which stores device data 838a and pattern or image data 838b), and the memory component 140. The memory component 140 includes hardware and may be configured as volatile and/or nonvolatile memory and, as such, may include random access memory (including SRAM, DRAM, and/or other types of RAM), flash memory, registers, compact discs (CD), digital versatile discs (DVD), and/or other types of non-transitory computer-readable mediums. Depending on the particular embodiment, the non-transitory computer-readable medium may reside within the user computing device 102 and/or external to the user computing device 102.

Additionally, the memory component 140 may be configured to store operating logic 842, the data gathering logic 144a, and the calculation logic 144b, each of which may be embodied as a computer program, firmware, and/or hardware, as an example. A local communications interface 846 is also included in FIG. 5 and may be implemented as a bus or other interface to facilitate communication among the components of the user computing device 102.

The processor 830 may include any hardware processing component operable to receive and execute instructions (such as from the data storage component 836 and/or memory component 140). The input/output hardware 832 may include and/or be configured to interface with a monitor, keyboard, mouse, printer, camera, microphone, speaker, and/or other device for receiving, sending, and/or presenting data. The network interface hardware 834 may include and/or be configured for communicating with any wired or wireless networking hardware, a satellite, an antenna, a modem, LAN port, wireless fidelity (Wi-Fi) card, WiMax card, mobile communications hardware, and/or other hardware for communicating with other networks and/or devices. From this connection, communication may be facilitated between the user computing device 102 and other computing devices.

Similarly, it should be understood that the data storage component 236 may reside local to and/or remote from the user computing device 102 and may be configured to store one or more pieces of data for access by the user computing device 102 and/or other components. In some embodiments, the data storage component 236 may be located remotely from the user computing device 102 and thus accessible via the network 100. In some embodiments however, the data storage component 236 may merely be a peripheral device, but external to the user computing device 102.

Included in the memory component 140 are the operating logic 842, the data gathering logic 144a, and the calculation logic 144b. The operating logic 842 may include an operating system and/or other software for managing components of the user computing device 102. Similarly, the data gathering logic 144a may be configured to cause the user computing device 102 to determine one or parameters related to the web of material, the imprint wheel, the anvil wheel and/or the nip-gap. The calculation logic 144b may cause the user computing device 102 to calculate alterations to a desired one or more rotary rolls to accurately imprint on the web of material 106.

It should be understood that the components illustrated in FIG. 5 are merely exemplary and are not intended to limit the scope of this disclosure. While the components in FIG. 5 are illustrated as residing within the user computing device 102, this is merely an example. In some embodiments, one or more of the components may reside external to the user computing device 102.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be understood to those skilled in the art that various other changes and modifications can be made without departing from the spirit and scope of the invention. It is therefore intended to cover in the appended claims all such changes and modifications that are within the scope of this invention.

What is claimed is:

1. A system for predicting the performance of a rotary unit operation on a web, comprising:
   a first rotary roll, a second rotary roll, a nip gap between the first rotary roll and the second rotary roll, a web enabled to travel through the nip gap, and a predetermined pattern, wherein the first rotary roll and the second rotary roll are enabled to imprint the predetermined pattern on the web;
   a computing device comprising a processor and a memory component, wherein the memory component stores logic that, when executed by the processor, causes the system to perform at least the following:
      receive input characteristics of the first rotary roll, the second rotary roll, the web, and the nip gap;
      receive the predetermined pattern;
      simulate a transformation performance on the web by the first rotary roll and the second rotary roll;
      output an analysis demonstrating a load impact factor; and
      analyze one or more load impact factors to determine if the system will output the predetermined pattern.

2. The system of claim 1, wherein the load impact factors comprise contact pressure, appropriate pressure range for the chosen material, pressure load on one or more rotary rolls, a load sharing between the rotary rolls, a load sharing between a bearing and a nip-gap control mechanism, and identifying potential roll vibration issue.

3. The system of claim 1, wherein simulating a transformation performance includes estimating system masses, damping and stiffness values and solves the system of equations.

4. The system of claim 3, wherein simulating a transformation performance further includes receiving input details related to the physical dimension of the rolls, stiffness and damping of various components.

5. The system of claim 1, wherein simulating a transformation performance includes predicting the nip gap between the first rotary roll and the second rotary roll as the web travels through the nip-width.

6. The system of claim 1, wherein the logic further causes the system to calculate the total force at each point across the nip-width.

7. The system of claim 1, wherein the system determines an appropriate nip gap response.

8. The system of claim 7, wherein determining the appropriate nip gap response further comprises determining the nip-width.

9. The system of claim 7, wherein determining the appropriate nip gap response further comprises calculating the force for a given area of the web.

10. The system of claim 1, wherein the first rotary roll or the second rotary roll is selected from the group comprising of imprint wheels, anvil wheels, bonding wheels, and cutting wheels.

11. A method for predicting the performance for a rotary unit operation, comprising:
   simulating, by a computing device, a nip gap between two rotary rolls wherein at least one of the two rotary rolls is an imprint wheel;
   determining, by the computing device, a web travel speed of a web of material, wherein the web of material travels in the nip between the two rolls;
   determining, by the computing device, the impact of at least one of the two rolls on the web of material;
   outputting an analysis demonstrating a load impact factor; and
   iterating using a load impact factor to determine a desirable impact of at least one of the two rolls on the web of material to achieve a predetermined pattern;
   outputting the desired inputs to achieve the desired impact level on the web of material.

12. The method of claim 11, wherein the load impact factors comprise contact pressure, appropriate pressure range for the chosen material, pressure load on one or more rotary rolls, a load sharing between the rotary rolls, a load sharing between a bearing and a bearer ring, and identifying potential roll vibration issue.

13. The method of claim 11, wherein simulating a transformation performance includes estimating system masses, damping and stiffness values and solves the system of equations.

14. The method of claim 13, wherein simulating a transformation performance further includes receiving input details related to the physical dimension of the rolls, stiffness and damping of various components.

15. The method of claim 11, wherein simulating a transformation performance includes predicting the nip gap between the first rotary roll and the second rotary roll as the web travels through the nip-width.

16. The method of claim 11, wherein the logic further causes the system to calculate the total force at each point across the nip-width.

17. The method of claim 11, wherein the method further comprises determining the appropriate nip gap response.

18. The method of claim 17, wherein determining the appropriate nip gap response further comprises determining the nip-width.

19. The method of claim 17, wherein determining the appropriate nip gap response further comprises calculating the force for a given area of the web.

20. The system of claim 11, wherein the first rotary roll or the second rotary roll is selected from the group comprising of imprint wheels, anvil wheels, bonding wheels, and cutting wheels.

* * * * *